United States Patent
Kwon

(10) Patent No.: US 7,377,579 B2
(45) Date of Patent: May 27, 2008

(54) STRUCTURE FOR MOUNTING HORIZONTAL HOOD LATCH TO UPPER PANEL OF FRONT-END MODULE OF AUTOMOBILE

(75) Inventor: Oh-jin Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 272 days.

(21) Appl. No.: 11/127,177

(22) Filed: May 12, 2005

(65) Prior Publication Data

US 2005/0253419 A1   Nov. 17, 2005

(30) Foreign Application Priority Data

May 17, 2004   (KR) ...................... 10-2004-0034800

(51) Int. Cl.
*E05B 65/19* (2006.01)
*B62D 25/08* (2006.01)

(52) U.S. Cl. ............................ 296/193.09; 296/193.11; 296/203.02

(58) Field of Classification Search ................ 296/193.09–193.11, 187.09, 203.02; 292/DIG. 14; 180/69.2, 69.21
See application file for complete search history.

(56) References Cited

U.S. PATENT DOCUMENTS

| | | | |
|---|---|---|---|
| 4,428,447 A |   | 1/1984 | Malen |
| 4,829,409 A | * | 5/1989 | Funkey ...................... 362/496 |
| 5,409,288 A | * | 4/1995 | Masuda ................. 296/193.09 |
| 5,658,041 A | * | 8/1997 | Girardot et al. ........ 296/193.09 |
| 6,014,876 A | * | 1/2000 | Taylor ......................... 70/240 |
| 6,186,583 B1 | * | 2/2001 | Martin .................. 296/193.09 |
| 6,189,958 B1 | * | 2/2001 | Guyomard et al. .... 296/193.09 |
| 6,196,624 B1 | * | 3/2001 | Bierjon et al. ......... 296/193.09 |
| 6,273,496 B1 | * | 8/2001 | Guyomard et al. .... 296/193.09 |
| 6,412,855 B1 | * | 7/2002 | Cantineau et al. ..... 296/187.01 |
| 6,464,289 B2 | * | 10/2002 | Sigonneau et al. .... 296/193.09 |
| 6,547,317 B1 | * | 4/2003 | Cheron et al. ......... 296/193.01 |
| 6,672,652 B2 | * | 1/2004 | Takeuchi et al. ....... 296/193.09 |
| 6,729,424 B2 | * | 5/2004 | Joutaki et al. ............. 180/68.4 |
| 6,814,400 B2 | * | 11/2004 | Henderson et al. .... 296/193.09 |
| 6,877,797 B2 | * | 4/2005 | Henderson et al. .... 296/203.02 |
| 6,880,882 B2 | * | 4/2005 | Andre et al. ........... 296/193.09 |

(Continued)

FOREIGN PATENT DOCUMENTS

JP          10-329753          12/1998

(Continued)

OTHER PUBLICATIONS

English Language Abstract of KR 10-2003-0015991.

(Continued)

*Primary Examiner*—D. Glenn Dayoan
*Assistant Examiner*—Greg Blankenship
(74) *Attorney, Agent, or Firm*—Greenblum & Bernstein, P.L.C.

(57) ABSTRACT

A structure for mounting a horizontal hood latch to an automobile includes an upper panel of a front-end module and a bracket over-molded onto the upper panel of the front-end module. A pair of through-openings are provided on opposite side portions of the bracket that allow both surfaces of the bracket to be coated by plastic material and the bracket to be mounted onto the upper panel, as the plastic material is poured thereon.

5 Claims, 5 Drawing Sheets

U.S. PATENT DOCUMENTS

| | | | |
|---|---|---|---|
| 6,923,495 B2 * | 8/2005 | Kishikawa et al. | 296/193.09 |
| 6,955,393 B2 * | 10/2005 | Staargaard et al. | 296/193.1 |
| 6,979,053 B2 * | 12/2005 | Kim | 296/193.09 |
| 7,008,008 B2 * | 3/2006 | Andre et al. | 296/203.02 |
| 7,044,536 B2 * | 5/2006 | Uchiyama | 296/203.02 |
| 7,052,076 B2 * | 5/2006 | Kim | 296/187.09 |

FOREIGN PATENT DOCUMENTS

| | | |
|---|---|---|
| JP | 2002-166848 | 6/2002 |
| JP | 2002-225748 | 8/2002 |
| KR | 10-2003-0015991 | 2/2003 |

OTHER PUBLICATIONS

English Language Abstract of JP 2002-166848.
English Language Abstract of JP 10-329753.
English Language Abstract of JP 2002-225748.

* cited by examiner

STRUCTURE FOR MOUNTING HORIZONTAL HOOD LATCH TO UPPER PANEL OF FRONT-END MODULE OF AUTOMOBILE

RELATED APPLICATIONS

The present disclosure relates to subject matter contained in Korean Application No. 10-2004-34800, filed on May 17, 2004, which is herein expressly incorporated by reference its entirety.

BACKGROUND OF THE INVENTION

1. Field of the Invention

The present invention relates to a structure for mounting a horizontal hood latch to an upper panel of a front-end module (FEM) of an automobile, and more particularly to a structure for mounting a horizontal hood latch to an upper panel of an FEM of an automobile which comprises a bracket over-molded onto the upper panel of the FEM, along with a horizontal hood latch fixed thereto, for allowing an engine hood to be fixed to the upper panel of the FEM.

2. Description of the Related Art

In general, the body of an automobile, which defines the appearance of the automobile, is comprised of a passenger compartment, an engine compartment, a trunk compartment, fenders, etc. Further, such an automobile body is divided into a front body, a center body, and a rear body, which are successively arranged in a longitudinal direction of an automobile.

Here, the front body is provided with a carrier for use in the installation of headlamps, a radiator, a condenser, a bumper, etc. Such a carrier has been obtained by applying a front-end module technique, which allows the headlamps, radiator, condenser, bumper, etc. to be wholly attached to a body panel, thereby improving assembling efficiency, shortening assembly time through reduction in the number of elements to be assembled, and securing accuracy in the assembling of products.

Considering a front-end module, to an upper panel thereof is attached a latch for use in the fixing of an engine hood. The latch is required to have a mechanical strength sufficient to endure a dynamic load of the hood generated when the hood is opened or closed for opening or closing an engine compartment of an automobile.

Such a latch for use in the fixing of the hood is classified into a vertical latch and a horizontal latch. FIGS. 1 and 2 illustrate a conventional structure wherein a vertical latch is mounted to an upper panel of a front-end module.

As shown in FIGS. 1 and 2, for the mounting of such a vertical latch, first, the vertical latch, designated as reference numeral 15, is attached to the front surface of an upper panel 12 of a front-end module 10, and rigidity-reinforcing ribs 7 are affixed to the rear surface of the upper panel 12 so as to achieve a satisfactory rigidity.

However, in case of a horizontal latch, since it must be mounted to the upper surface of the upper panel, a lower portion thereof inevitably occupies a space required for the installation of the reinforcing ribs, thereby making it impossible to install the rigidity-reinforcing ribs to the rear surface of the upper panel of the FEM.

SUMMARY OF THE INVENTION

Therefore, the present invention has been made in view of the above problems, and it is an object of the present invention to provide a structure for mounting a horizontal hood latch to an upper panel of a front-end module with improved rigidity, sufficient to endure a load applied to the horizontal hood latch.

In accordance with the present invention, the above and other objects can be accomplished by the provision of a structure for mounting a horizontal hood latch to an upper panel of a front-end module of an automobile, comprising a bracket, to which a horizontal hood latch is fixed, the bracket being over-molded onto the upper panel of the front-end module.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Further, the present embodiment is given by way of illustration and example only, and is not intended to limit the range of the present invention. Multiple variations and modifications are possible through the technical idea of the present invention.

Figure 1:
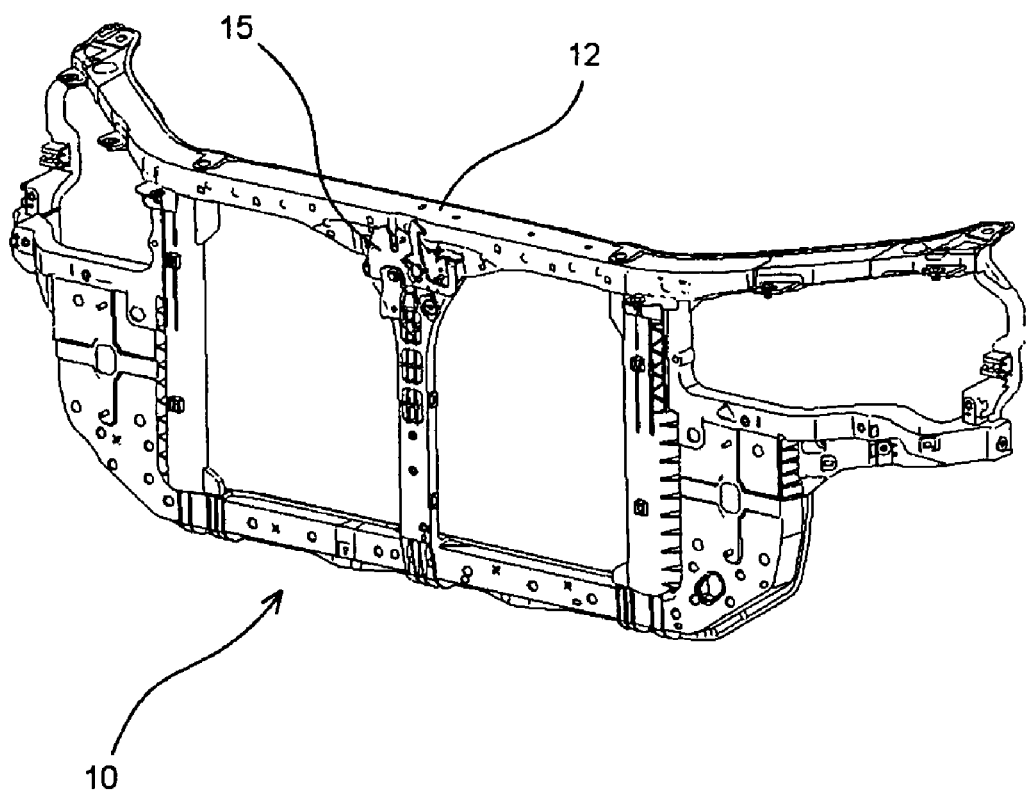
FIG. 1 is a front perspective view illustrating a conventional vertical latch mounting structure for a front-end module (FEM)
Figure 2:
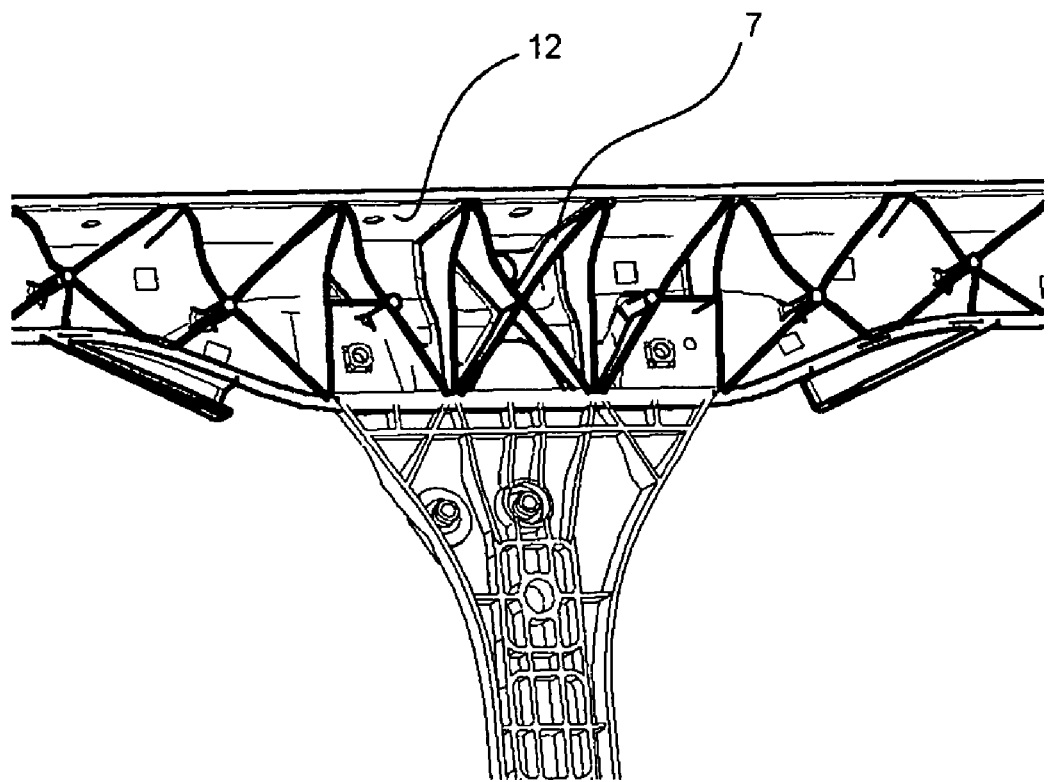
FIG. 2 is a rear perspective view of the conventional vertical latch mounting structure for an FEM.
Figure 3:
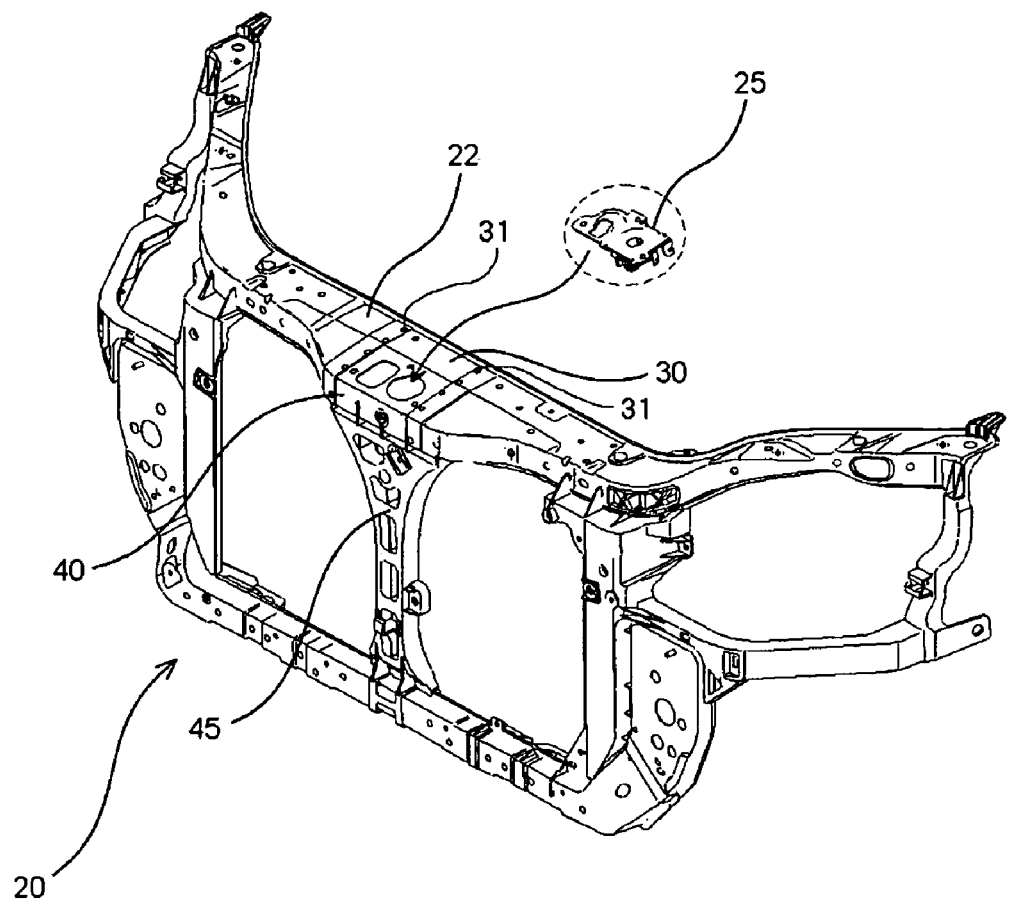
FIG. 3 is a front perspective view illustrating a horizontal latch mounting structure for an upper panel of an FEM of an automobile in accordance with the present invention.
Figure 4:
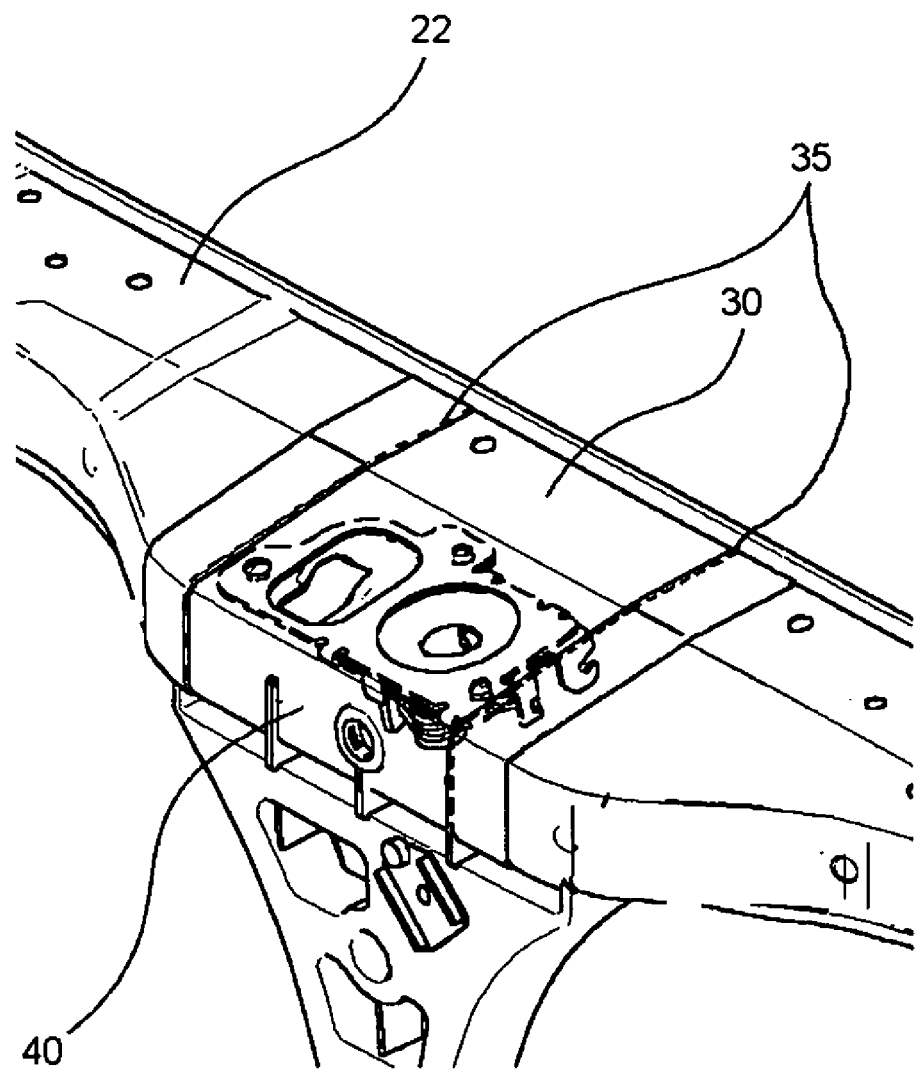
FIG. 4 is an enlarged perspective view of the upper panel of the FEM in accordance with the present invention.
Figure 5:
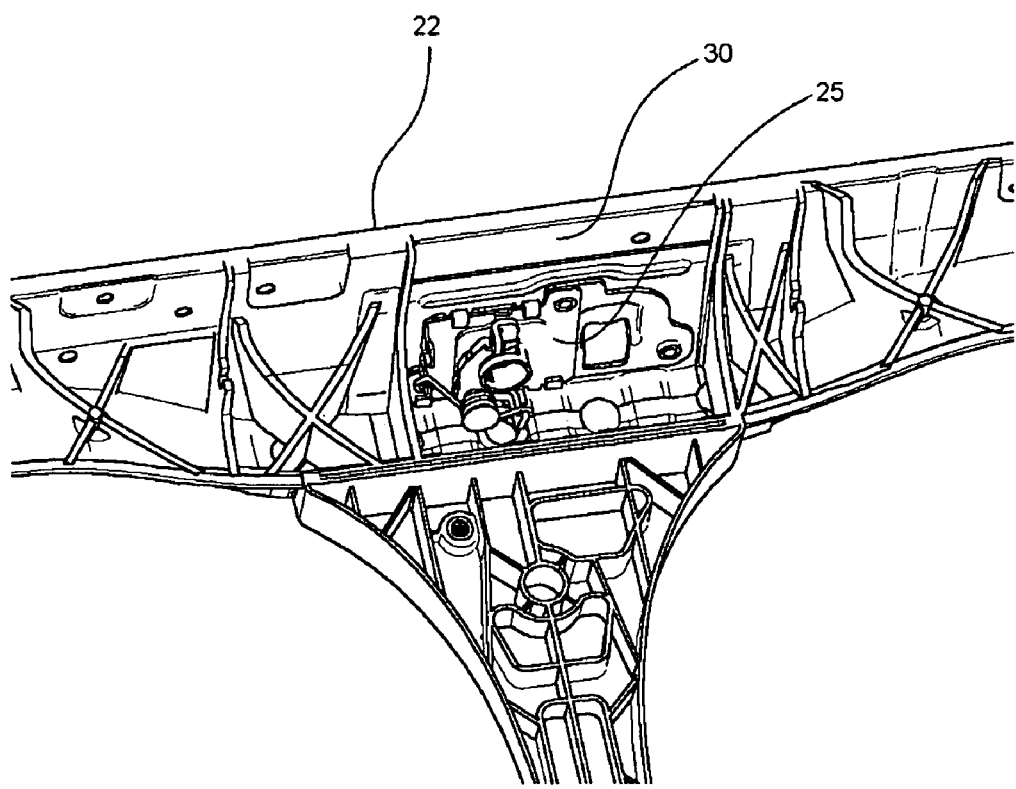
FIG. 5 is a rear perspective view of the horizontal latch mounting structure of the present invention.

FIG. 3 is a front perspective view illustrating a horizontal latch mounting structure for an upper panel of an FEM of an automobile in accordance with the present invention. FIG. 4 is an enlarged perspective view of the upper panel of the FEM in accordance with the present invention. FIG. 5 is a rear perspective view of the horizontal latch mounting structure of the present invention.

As shown in the above drawings, the mounting structure of the present invention comprises a bracket 30, to which a horizontal latch 25 is fixed. The bracket 30 is over-molded onto an upper panel 22 of a front-end module 20 of an automobile, along with the horizontal latch 25.

Preferably, the bracket 30 is formed at opposite side portions thereof with a pair of through-openings 31 for allowing the bracket 30 to be mounted onto the upper panel 22, as a plastic material is poured thereon so that both surfaces of the bracket 30 are covered by the plastic material.

The bracket 30, to which the horizontal latch 25 was fixed, is formed along a front edge thereof with a bent portion 40, so that it is over-molded onto the upper panel 20 along dashed lines 35 shown in FIG. 4.

That is, the bracket 30 adjoins the upper panel 22 at the outside near the dashed lines 35, and the through-openings 31 of the bracket 30 are formed at opposite side portions of the bracket 30 along the respective dashed lines 35.

In this case, the bent portion 40 of the bracket 30 forms a boundary at a region where the upper panel 22 is bonded to a center panel 45 of the front-end module 20.

With such a configuration, a vertical load applied to the horizontal latch 25 is transmitted through the bent portion 40 of the bracket 30, so that it is partially supported by the center panel 45. Even if any bending momentum is generated in the bracket 30 by the vertical load, by virtue of the fact that the bracket 30 is over-molded onto the upper panel 22, and the bent portion 40 of the bracket 30 is inclined so as to be difficult to be bent by the vertical load, it has no effect.

In this way, the bracket 30 successfully endures the vertical load applied to the horizontal latch 25, and allows the load to be uniformly distributed throughout the front-end module 20. Therefore, there is no breakage due to the load applied to the horizontal latch 25 in a region where the bracket 30 is mounted.

The bracket 30 is preferably made of a steel material having a thickness of 1.5 mm to 1.7 mm. Such a thickness range is selected in consideration of an acceptable strength of the bracket 30 for allowing it to endure the load applied to the horizontal latch 25.

As apparent from the above description, the present invention provides a structure for mounting a horizontal hood latch to an upper panel of a front-end module with an improved rigidity, sufficient to endure a load applied to the horizontal hood latch.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure for mounting a horizontal hood latch to an automobile, comprising:
    a front-end module having an upper panel; and
    a bracket over-molded onto the upper panel of the front-end module,
    wherein the horizontal hood latch is configured to be fixed to the bracket, and the bracket adjoins the upper panel at an outside thereof and includes a plurality of openings provided at opposite sides along portions adjoining the horizontal hood latch, and
    wherein the bracket further comprises a bent portion that extends downwardly to form a boundary.

2. The structure as set forth in claim 1, wherein the openings are configured to allow the bracket to be mounted onto the upper panel as a plastic material is poured thereon, so that both surfaces of the bracket are covered by the plastic material.

3. The structure as set forth in claim 1, wherein the bracket is made of a steel material having a thickness of 1.5 mm to 1.7 mm.

4. A structure for mounting a horizontal hood latch to an automobile, comprising:
    a front-end module having an upper panel; and
    a bracket over-molded onto the upper panel of the front-end module,
    wherein the horizontal hood latch is configured to be fixed to the bracket, and the bracket adjoins the upper panel at an outside thereof and includes a plurality of openings provided at opposite sides along portions adjoining the horizontal hood latch, wherein the bracket further comprises a bent portion that extends downwardly to form a boundary at a region where the upper panel is bonded to a central panel of the front-end module, such that the bracket endures a vertical load applied to the latch and allows the load to be uniformly distributed throughout the front-end module.

5. The structure as set forth in claim 4, wherein the bracket is made of a steel material having a thickness of 1.5 mm to 1.7 mm.

* * * * *